(12) United States Patent
Assulin et al.

(10) Patent No.: US 9,809,475 B2
(45) Date of Patent: Nov. 7, 2017

(54) ACCUMULATED RESIDUE REMOVAL FROM CARRIERS USED IN A WATER TREATMENT SYSTEM

(71) Applicant: Aqwise—Wise Water Technologies Ltd, Herzliya (IL)

(72) Inventors: Nir Assulin, Kiryat Tivon (IL); Shmuel Eliraz, Sde Gat (IL); Ohad Reinhartz, Beit Yehoshua (IL)

(73) Assignee: Aqwise-Wise Water Technologies Ltd, Herzlia (IL)

( * ) Notice: Subject to any disclaimer, the term of this patent is extended or adjusted under 35 U.S.C. 154(b) by 403 days.

(21) Appl. No.: 14/399,349

(22) PCT Filed: May 7, 2013

(86) PCT No.: PCT/IL2013/050391
§ 371 (c)(1),
(2) Date: Nov. 6, 2014

(87) PCT Pub. No.: WO2013/168155
PCT Pub. Date: Nov. 14, 2013

(65) Prior Publication Data
US 2015/0083166 A1    Mar. 26, 2015

Related U.S. Application Data

(60) Provisional application No. 61/643,397, filed on May 7, 2012.

(51) Int. Cl.
*B01D 24/46* (2006.01)
*B01D 29/70* (2006.01)
*B01D 41/00* (2006.01)
*C02F 3/08* (2006.01)
(Continued)

(52) U.S. Cl.
CPC ............. *C02F 3/087* (2013.01); *B03B 5/02* (2013.01); *B03B 5/623* (2013.01); *B08B 3/10* (2013.01);
(Continued)

(58) Field of Classification Search
CPC ..... B01D 24/46; B01D 24/4689; C02F 3/223; C02F 2303/16; C02F 3/087; C02F 3/08;
(Continued)

(56) References Cited

U.S. PATENT DOCUMENTS 4,177,144 A   12/1979   Hickey et al.
4,244,531 A   1/1981    Szegvari
(Continued)

FOREIGN PATENT DOCUMENTS

EP   0958250       10/1999
EP   0952120       11/1999
WO   WO-9722559   6/1997

OTHER PUBLICATIONS

European Search Report of European Application No. EP 13786956 dated Dec. 2, 2015.
(Continued)

*Primary Examiner* — Claire Norris
(74) *Attorney, Agent, or Firm* — Pearl Cohen Zedek Latzer Baratz LLP

(57) ABSTRACT

A water treatment system including an enclosure for water to be treated, a multiplicity of biomass carriers located within the enclosure, at least one airlift in the enclosure for raising the water and the biomass carriers and at least one mechanical biomass carrier accumulated residue removal apparatus operative to remove accumulated residue from the biomass carriers.

17 Claims, 4 Drawing Sheets

(51) Int. Cl.
*C02F 3/22* (2006.01)
*B03B 5/02* (2006.01)
*B03B 5/62* (2006.01)
*B08B 3/10* (2006.01)
*B08B 7/02* (2006.01)
*C02F 101/00* (2006.01)
*B08B 9/08* (2006.01)

(52) U.S. Cl.
CPC ............... *B08B 3/104* (2013.01); *B08B 7/02* (2013.01); *C02F 3/08* (2013.01); *C02F 3/223* (2013.01); *B08B 9/08* (2013.01); *B08B 9/0856* (2013.01); *C02F 2101/00* (2013.01); *C02F 2203/006* (2013.01); *C02F 2303/16* (2013.01); *C02F 2303/20* (2013.01); *C02F 2303/22* (2013.01); *Y02W 10/15* (2015.05)

(58) Field of Classification Search
CPC .. B03B 5/02; B03B 5/623; B08B 3/10; B08B 7/02
USPC .......................................... 210/618, 106, 786
See application file for complete search history.

(56) References Cited

U.S. PATENT DOCUMENTS

| | | | |
|---|---|---|---|
| 4,521,311 | A | 6/1985 | Fuchs et al. |
| 4,960,509 | A | 10/1990 | McNeill |
| 5,976,365 | A | 11/1999 | Petit |
| 6,024,876 | A | 2/2000 | Pannier et al. |
| 7,699,177 | B2 | 4/2010 | Craig |
| 7,713,426 | B2 | 5/2010 | Newcombe |
| 2005/0061715 | A1 | 3/2005 | Wolfgang |
| 2007/0215525 | A1* | 9/2007 | Craig ............... B03B 5/623 209/159 |
| 2007/0264704 | A1* | 11/2007 | Van Toever ........ B01F 3/04773 435/262 |
| 2010/0180768 | A1 | 7/2010 | Flokvang |

OTHER PUBLICATIONS

International Search Report for International Application No. PCT/IL2013/050391, dated Aug. 6, 2013.

* cited by examiner

ACCUMULATED RESIDUE REMOVAL FROM CARRIERS USED IN A WATER TREATMENT SYSTEM

CROSS-REFERENCE TO RELATED APPLICATIONS

This application is a National Phase Application of PCT International Application No. PCT/IL2013/050391, International Filing Date May 7, 2013, claiming benefit of U.S. Patent Application No. 61/643,397, filed May 7, 2012, which are hereby incorporated by reference.

REFERENCE TO RELATED APPLICATIONS AND PATENTS

Reference is hereby made to U.S. Provisional Patent Application Ser. No. 61/643,397, filed May 7, 2012, entitled APPARATUS AND METHOD FOR WASTE WATER TREATMENT, the disclosure of which is hereby incorporated by reference and priority of which is hereby claimed pursuant to 37 CFR 1.78(a) (4) and (5)(i).

Reference is also made to applicant/assignee's U.S. Pat. Nos. 6,616,845, 6,726,838 and 8,012,353 and PCT Published Patent Applications WO 2009/107128 and WO 2010/026564, the descriptions of which are hereby incorporated by reference.

FIELD OF THE INVENTION

The present invention relates to water and wastewater treatment generally and more particularly to removal of accumulated scale and other residues from biomass carriers used in water and wastewater treatment.

BACKGROUND OF THE INVENTION

A problem has been found to exist in water and wastewater treatment systems and methods which employ biomass carriers as the result of the accumulation of scale, such as calcium carbonate, and other residues, such as fat, oil and other organic matter, on the biomass carriers.

SUMMARY OF THE INVENTION

The present invention seeks to provide apparatus and a methodology for removing accumulated scale and other residues from biomass carriers used in water and wastewater treatment systems.

There is thus provided in accordance with a preferred embodiment of the present invention a water treatment system including an enclosure for water to be treated, a multiplicity of biomass carriers located within the enclosure, at least one airlift in the enclosure for raising the water and the biomass carriers and at least one mechanical biomass carrier accumulated residue removal apparatus operative to remove accumulated residue from the biomass carriers.

There is also provided in accordance with another preferred embodiment of the present invention for use in a water treatment system including an enclosure for water to be treated, a multiplicity of biomass carriers located within the enclosure and at least one airlift in the enclosure for raising the water and the biomass carriers, a mechanical biomass carrier accumulated residue removal apparatus operative for removing accumulated residue from the biomass carriers.

Preferably, the at least one mechanical biomass carrier accumulated residue removal apparatus is operatively associated with the at least one airlift, whereby the at least one airlift raises the biomass carriers into operative engagement with the at least one mechanical biomass carrier accumulated residue removal apparatus. Additionally, the at least one mechanical biomass accumulated residue removal apparatus includes impact elements which apply a shear force to the biomass carriers which are burdened with residue, thereby causing detachment of residue therefrom.

In accordance with a preferred embodiment of the present invention the at least one mechanical biomass accumulated residue removal apparatus includes a generally open-ended vertically upstanding cylindrical wall and a downwardly-tapered, generally truncated, open-ended conical element at least partially within the cylindrical wall. Additionally, the at least downwardly-tapered, generally truncated, open-ended conical element is at least partially within the enclosure.

Preferably, the at least one mechanical biomass accumulated residue removal apparatus also includes a motor drivingly coupled to a drive shaft which extends vertically and rotates, preferably along a longitudinal axis of the cylindrical wall, at least one pair of lifting vanes driven for rotation about the longitudinal axis and a plurality of radially extending bats which lie at various azimuthal angles and heights above the water in the enclosure and biomass carriers which are at least partially burdened by residue and lie at or near the bottom of the enclosure are driven upward by the airlift together with water to the interior of the conical element, the lifting vanes lift the residue-burdened biomass carriers out of the water, and the water, raised by the airlift, flows over the upper edge of conical element and falls back into the enclosure, the residue-burdened biomass carriers are impacted by the bats and hurled against the cylindrical wall, thereby applying shear stresses to the residue-burdened biomass carriers and causing detachment of residue therefrom and the residue removed biomass carriers are allowed to fall back into the enclosure.

There is further provided in accordance with yet another preferred embodiment of the present invention a method for removing accumulated residue from biomass carriers in a water treatment system, the water treatment system including an enclosure for water to be treated and a multiplicity of biomass carriers located within the enclosure, the method including removing residue burdened biomass carriers from the enclosure, applying a shear force to the residue burdened biomass carriers, thereby causing detachment of residue therefom and providing residue removed biomass carriers and returning the residue removed biomass carriers to the enclosure.

Preferably, the applying a shear force includes mechanically hurling the residue burdened biomass carriers against a wall. Additionally, the method for removing residue from biomass carriers in a water treatment system also includes returning the residue to the enclosure.

In accordance with a preferred embodiment of the present invention the removing residue burdened biomass carriers from the enclosure includes removing water together with the residue burdened biomass carriers from the enclosure, lifting the residue burdened biomass carriers from the water and returning the water to the enclosure.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
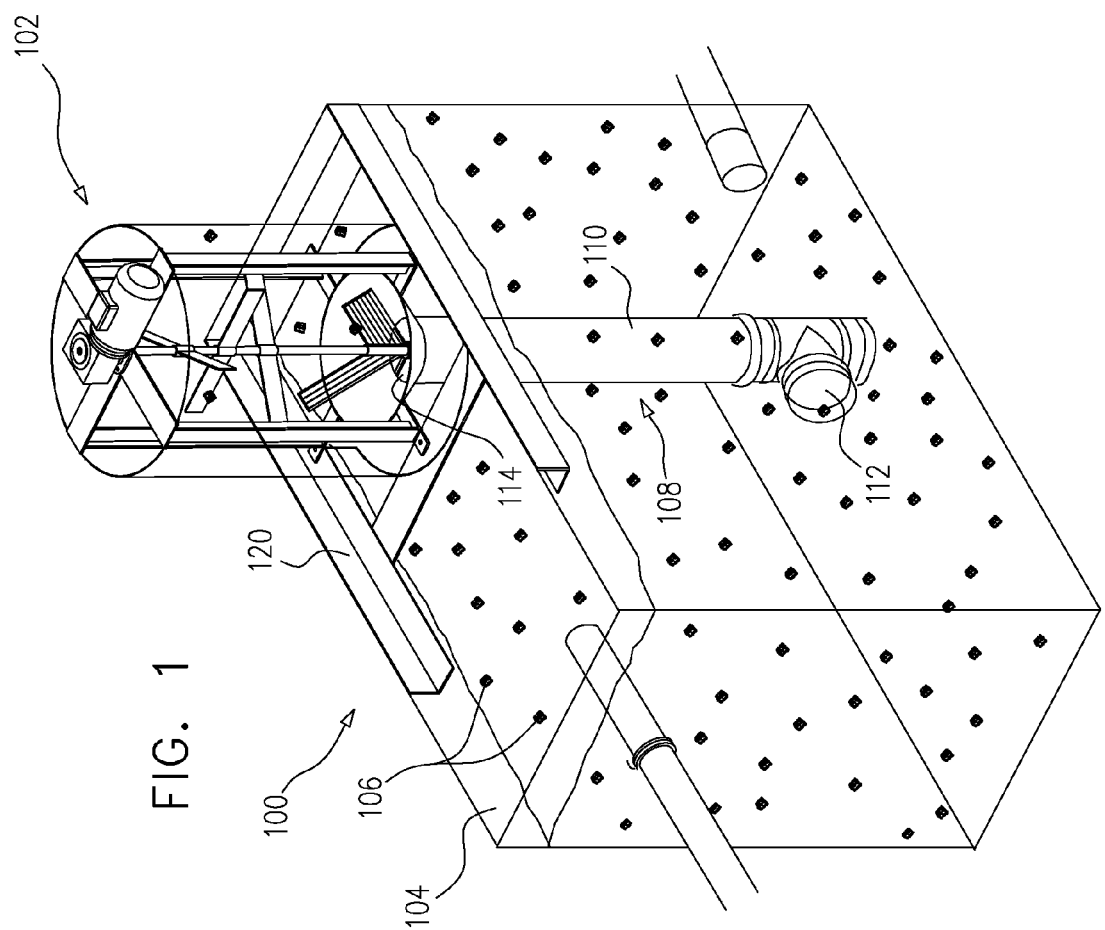
FIG. 1 is a simplified illustration of a water treatment system including biomass carrier accumulated residue removal apparatus, constructed and operative in accordance with a preferred embodiment of the present invention.

Reference is now made to FIG. 1, which is a simplified illustration of a water treatment system, generally designated by reference numeral 100, including biomass carrier accumulated residue removal apparatus, generally designated by reference numeral 102, constructed and operative in accordance with a preferred embodiment of the present invention. The water treatment system 100 may be any suitable water treatment system employing biomass carriers. A preferred water treatment system is described in one or more of applicant/assignee's U.S. Pat. Nos. 6,616,845, 6,726,838 and 8,012,353 and PCT Published Patent Applications WO 2009/107128 and WO 2010/026564, the disclosures of which are hereby incorporated by reference.

Water treatment system 100 includes one or more enclosure 104 in which are disposed a multiplicity of biomass carriers 106, whose function is described in one or more of applicant/assignee's U.S. Patent Applications U.S. Pat. Nos. 6,616,845, 6,726,838 and 8,012,353 and PCT Published Patent Applications WO 2009/107128 and WO 2010/026564, the disclosures of which are hereby incorporated by reference.

In accordance with a preferred embodiment of the invention, biomass carrier accumulated residue removal apparatus 102 is operatively associated with an airlift 108 as shown in FIG. 1. Airlift 108 includes a pipe 110, which extends from a location near the bottom of enclosure 104, including a bottom opening 112 and a top opening 114, through which biomass carriers 106 from enclosure 104 are supplied to biomass carrier accumulated residue removal apparatus 102. As seen particularly in FIG. 1, bottom opening 112 of pipe 110 is located near a bottom end of enclosure 104 and top opening 114 of pipe 110 is located below a lower end of biomass carrier accumulated residue removal apparatus 102.

The system will be positioned on the reactor's edge by means of a metal frame. A tube will be used as a carrier conveyer through an airlift device. The airlift will pump the scaled carriers from the bottom of the reactor to the cleaning device. The airlift flow will be controlled by the amount of air supplied to the airlift. The carriers, with water, will reach the cone shaped device and will be lift up by meshed lifting wings. At this stage, the carriers will be separated from the water, the water will overflow from the conical edge back to the reactor. The carriers will be thrown towards the striking blades and the shell. As a consequence of the shear stress applied on the carriers, the scale will be detached from the carriers and will fall back to the reactor. The treated carriers will fall back to the reactor as well. The meshed lifting wing is shaped in a bent configuration to help lift up the carriers towards the striking blades and the shell. The height of the meshed lifting wings and the blades on the main axis can be adjusted.

Figure 2:
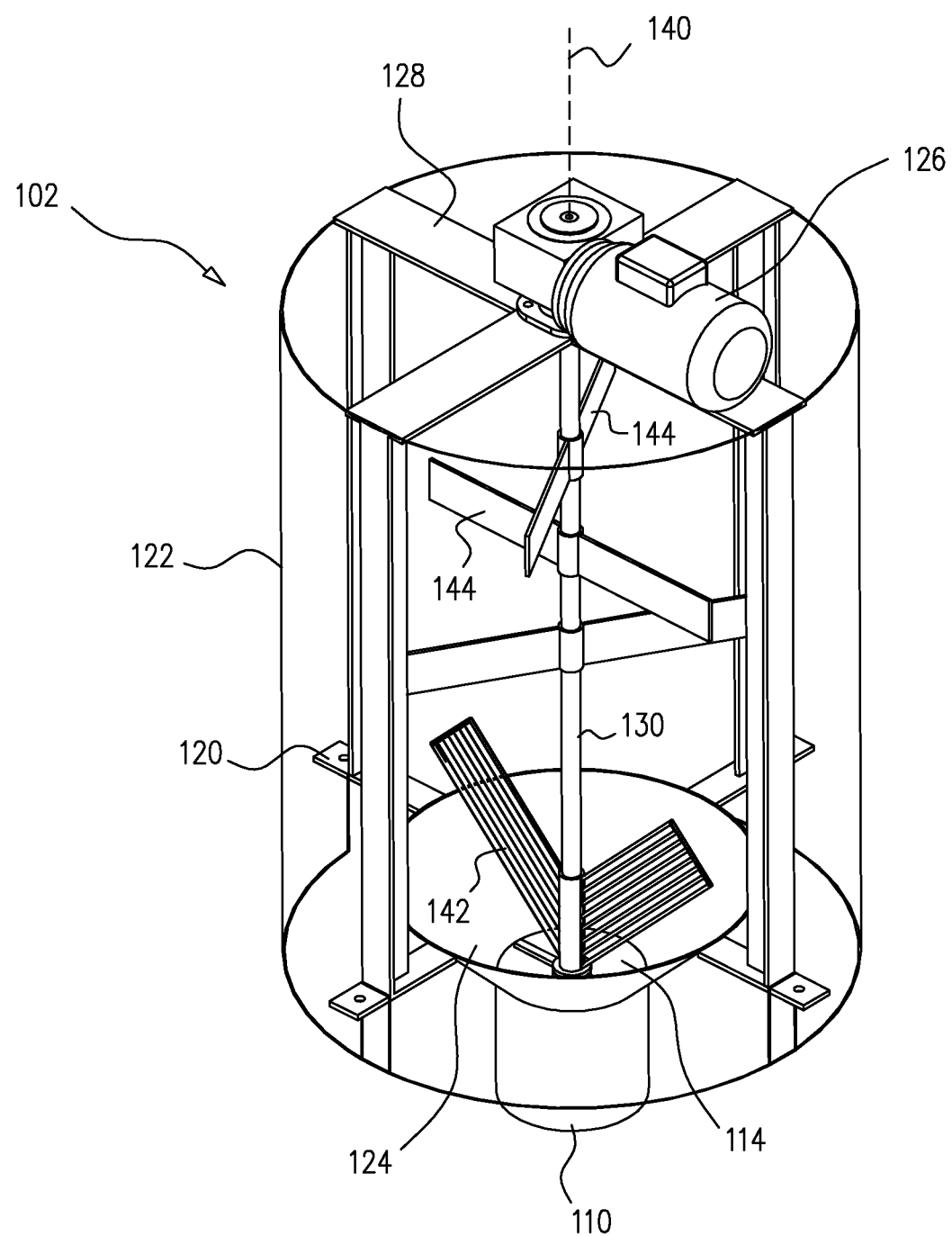
FIG. 2 is a simplified perspective view illustration of biomass carrier accumulated residue removal apparatus useful in the water treatment system of FIG. 1.
Figure 3:
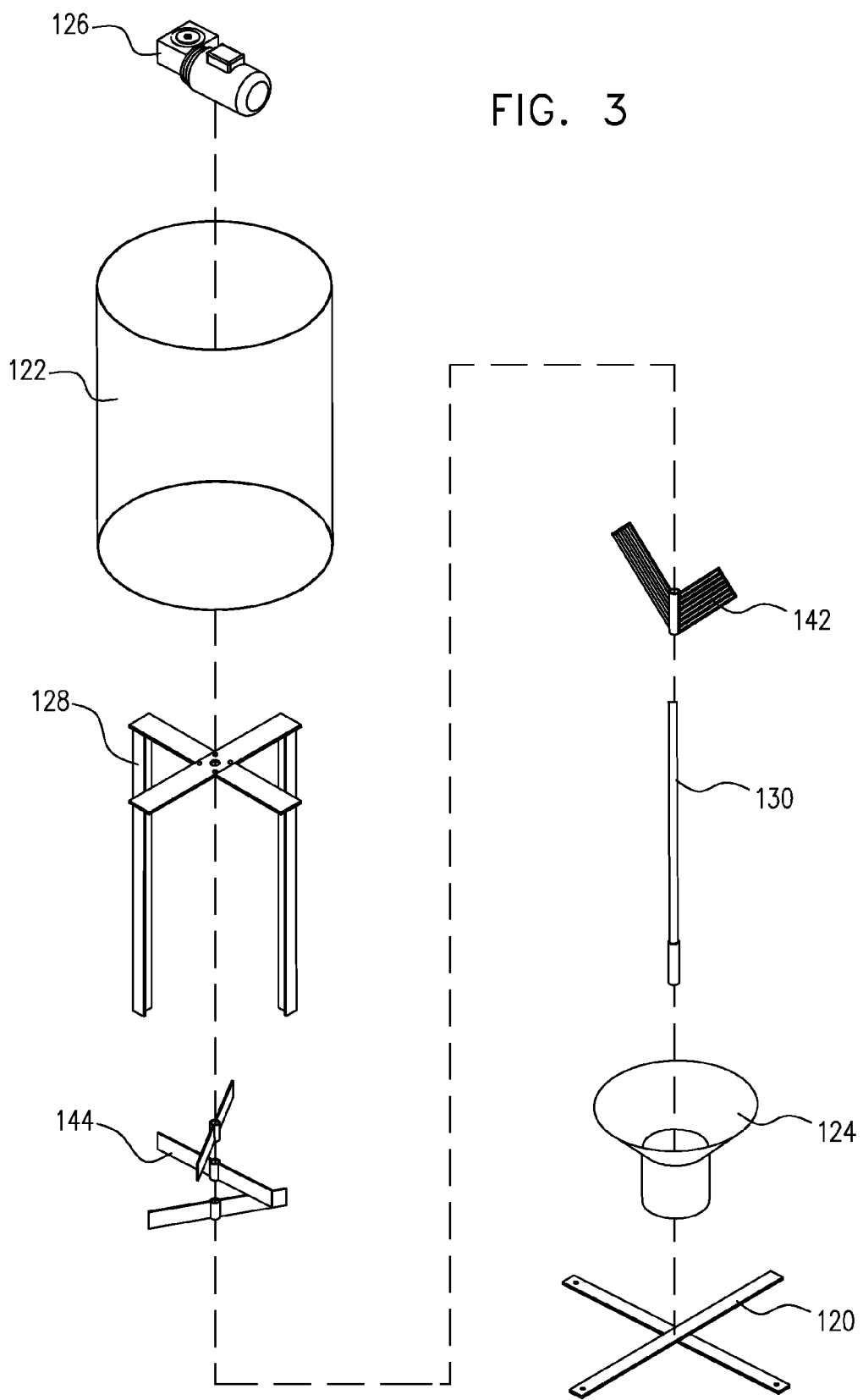
FIG. 3 is a simplified exploded view illustration of a preferred embodiment of the biomass carrier accumulated residue removal apparatus of FIGS. 1 & 2.

As seen with greater particularity with additional reference to FIGS. 2-3, biomass carrier accumulated residue removal apparatus 102 preferably comprises a supporting frame 120, which is, in turn, supported on enclosure 104. The supporting frame 120 preferably supports a generally open-ended vertically upstanding cylindrical wall 122.

Supporting frame 120 also supports a downwardly-tapered, generally truncated, open-ended conical element 124 at least partially within cylindrical wall 122. It is appreciated that a portion of downwardly-tapered, generally truncated, open-ended conical element 124 may be located within enclosure 104. Alternatively, downwardly-tapered, generally truncated, open-ended conical element 124 may be located entirely above the top of enclosure 104.

A generally truncated bottom portion of conical element 124 is connected to a top end of pipe 110 at top opening 114 thereof. A motor 126, preferably an electric motor, is mounted preferably above cylindrical wall 122 on a motor support frame 128, which is, in turn, preferably mounted on supporting frame 120. Electric motor preferably is drivingly coupled to a drive shaft 130, which extends vertically and rotates, preferably along a longitudinal axis 140 of cylindrical wall 122.

Fixed to drive shaft 130, for rotation therewith about longitudinal axis 140, are at least one pair of lifting vanes 142, preferably formed of an open mesh material, which preferably extend upwardly and radially outwardly with respect to drive shaft 130. Also fixed to drive shaft 130, for rotation therewith about axis 140, are a plurality of radially extending bats 144 which lie at various azimuthal angles and heights above vanes 142.

Figure 4:
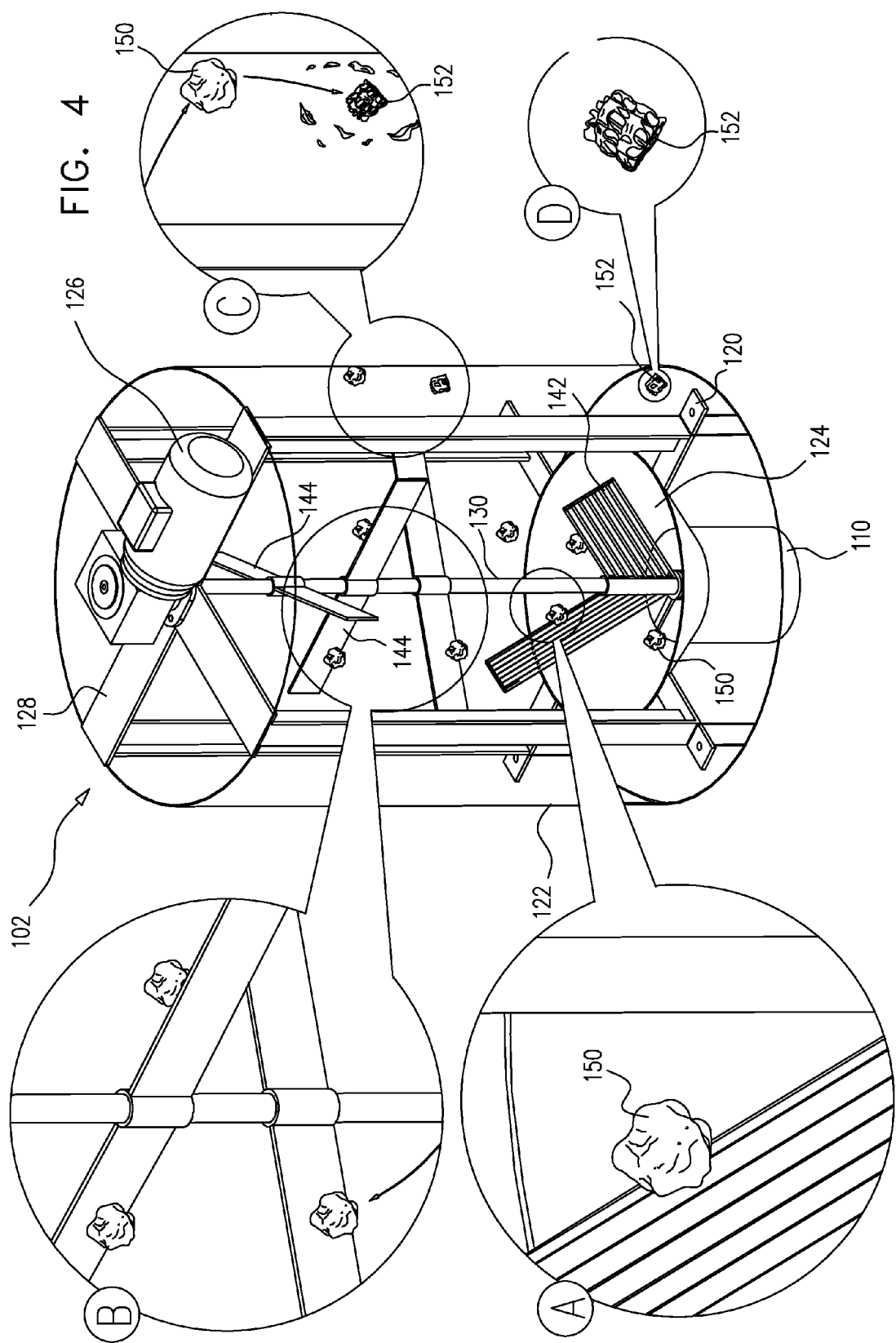
FIG. 4 is a simplified illustration of the process of biomass carrier accumulated residue removal provided by the apparatus of FIGS. 1-3.

Reference is now made to FIG. 4, which is a simplified illustration of the process of biomass carrier accumulated residue removal provided by the apparatus of FIGS. 1-3.

As seen in FIG. 1, biomass carriers which are at least partially burdened by residue, designated by reference numeral 150, lying at or near the bottom of enclosure 104, are driven upward by airlift 108 through pipe 110 together with water to the interior of the conical element 124. Lifting vanes 142 lift the residue-burdened biomass carriers 150, as seen in enlargement A of FIG. 4, out of the water, and the water, raised by airlift 108, flows over the upper edge of conical element 124 and falls back into enclosure 104.

As seen in enlargement B of FIG. 4, the residue-burdened biomass carriers 150 are impacted by the bats 144 and hurled against cylindrical wall 122, thereby applying shear stresses thereto and causing detachment of residue from the residue-burdened biomass carriers 150. As seen in enlargement C of FIG. 4, residue removed biomass carriers 152 and the detached residue are allowed to fall back into enclosure 104.

It is appreciated that the biomass carrier accumulated residue removal apparatus 102 may be operated continuously or intermittently as appropriate for a given application.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. A water treatment system comprising:
   an enclosure for water to be treated;
   a multiplicity of biomass carriers located within said enclosure;
   at least one airlift comprising a pipe extending upward from a location near a bottom end of said enclosure and configured to raise water and biomass carriers from said enclosure; and
   at least one mechanical biomass carrier accumulated residue removal apparatus located above the airlift and configured to receive the biomass carriers raised by the airlift, wherein the residue removal apparatus comprises:
      a rotatable drive shaft;
      lifting vanes fixed to the drive shaft to lift the raised biomass carriers and separate the raised biomass carriers from the raised water; and,
      radially extending bats fixed to the drive shaft and located above the lifting vanes to impact lifted biomass carriers and to remove accumulated residue from said biomass carriers.

2. A water treatment system according to claim 1 and wherein said at least one mechanical biomass carrier accumulated residue removal apparatus is associated with said at least one airlift, whereby said at least one airlift raises said biomass carriers into said at least one mechanical biomass carrier accumulated residue removal apparatus.

3. A water treatment system according to 2, wherein said at least one mechanical biomass accumulated residue removal apparatus is configured to cause detachment of residue therefrom when out of the water.

4. A water treatment system according to claim 3 and wherein said at least one mechanical biomass accumulated residue removal apparatus comprises:
   an open-ended vertically upstanding cylindrical wall; and
   a downwardly-tapered, truncated, open-ended conical element at least partially within said cylindrical wall.

5. A water treatment system according to claim 4 and wherein said at least downwardly-tapered, truncated, open-ended conical element is at least partially within said enclosure.

6. A water treatment system according to claim 4 and wherein;
   said lifting vanes lift said residue-burdened biomass carriers out of the water, said residue removal apparatus is configured such that the water, raised by the airlift, flows over an upper edge of the conical element and falls back into the enclosure.

7. A water treatment system according claim 1, wherein the radially extending bats are fixed to the drive shaft at various azimuthal angles and heights above the water in the enclosure.

8. A mechanical biomass carrier accumulated residue removal apparatus configured to be located above an enclosure of a water treatment system and configured to receive biomass carriers from an airlift of the water treatment system, whereby said airlift raises biomass carriers and water into said mechanical biomass carrier accumulated residue removal apparatus, wherein said removal apparatus comprises:
   a rotatable drive shaft;
   lifting vanes fixed to the drive shaft to lift the raised biomass carriers and separate the raised biomass carriers from the raised water; and
   radially extending bats fixed to the drive shaft and located above the lifting vanes to impact lifted biomass carriers and to remove accumulated residue from said biomass carriers.

9. A mechanical biomass carrier accumulated residue removal apparatus according to claim 8 and wherein said mechanical biomass accumulated residue removal apparatus is configured to cause detachment of residue therefrom when out of the water.

10. A mechanical biomass carrier accumulated residue removal apparatus according to claim 9 and comprising:
    an open-ended vertically upstanding cylindrical wall; and
    a downwardly-tapered, truncated, open-ended conical element at least partially within said cylindrical wall.

11. A mechanical biomass carrier accumulated residue removal apparatus according to claim 10 and wherein
    said lifting vanes lift said-residue-burdened biomass carriers out of the water, wherein said residue removal apparatus is configured such that the water, raised by the airlift, flows over an upper edge of said conical element and falls back into the enclosure.

12. A method of removing accumulated residue from biomass carriers in a water treatment system, said water treatment system including an enclosure for water to be treated and a multiplicity of biomass carriers located within said enclosure, the method comprising:
    removing water together with residue burdened biomass carriers from said enclosure into a residue removal apparatus;
    lifting the residue burdened biomass carriers out of the removed water, while the removed water is directed to fall back into the enclosure;
    applying a shear force to said residue burdened biomass carriers when said carriers are lifted above the water. thereby causing detachment of residue therefrom to form residue removed biomass carriers; and
    returning said residue removed biomass carriers to said enclosure.

13. A method according to claim 12 and wherein applying the shear force comprises mechanically hurling said residue burdened biomass carriers against a wall.

14. A method according to claim 12 and also comprising returning said residue to said enclosure.

15. A method according to claim 12, wherein removing water together with the residue burdened biomass carriers comprises:
    upwardly driving the residue burdened biomass carriers together with water via a pipe of an airlift into a downwardly-tapered, truncated, open-ended conical element connected to a top end of the pipe; and
    wherein lifting the residue burdened biomass carriers out of the removed water comprise:
    lifting the residue burdened biomass carriers from the conical. element into an open-ended cylindrical wall, while the water flows over an upper edge of the conical element and falls back into the enclosure.

16. A method according to claim 15, wherein lifting the residue burdened biomass carriers out of the removed water comprises lifting the residue burdened biomass carriers by rotating lifting vanes around a longitudinal axis of the cylindrical wall.

17. A method according claim 12, wherein applying the shear force comprises rotating bats around a longitudinal axis of the cylindrical wall to impact said residue burdened biomass carriers.

* * * * *